(12) United States Patent
Lockard (10) Patent No.: US 6,805,269 B2
(45) Date of Patent: Oct. 19, 2004

(54) PACKABLE CART

(76) Inventor: Kenneth L. Lockard, 3720 McCollum Church Rd., Lineville, AL (US) 36266

( * ) Notice: Subject to any disclaimer, the term of this patent is extended or adjusted under 35 U.S.C. 154(b) by 34 days.

(21) Appl. No.: 10/036,242

(22) Filed: Jan. 4, 2002

(65) Prior Publication Data

US 2003/0127476 A1 Jul. 10, 2003

(51) Int. Cl.$^7$ .............................. A45F 4/02; A45F 4/04; A45F 3/14; A45F 3/04; A45F 3/08
(52) U.S. Cl. ................... 224/153; 224/154; 224/184; 224/628; 224/630; 280/30; 403/354
(58) Field of Search ............................... 224/153, 154, 224/156, 157, 184, 628, 630; 403/354, 319, 329; 24/589.1; 280/30

(56) References Cited

U.S. PATENT DOCUMENTS

| | | | | |
|---|---|---|---|---|
| 2,287,117 A | * | 6/1942 | Montalto | 403/354 |
| 3,225,985 A | * | 12/1965 | Romney | 224/153 |
| 3,359,020 A | * | 12/1967 | O'Donnell | 403/354 |
| 3,550,997 A | * | 12/1970 | Strand | 224/153 |
| 3,822,813 A | * | 7/1974 | Carter | 224/153 |
| 3,856,191 A | * | 12/1974 | Pohl | 224/153 |
| 4,738,383 A | * | 4/1988 | Dearborn et al. | 224/155 |
| 4,809,892 A | * | 3/1989 | Chinski et al. | 224/153 |
| 4,871,101 A | * | 10/1989 | Bunz et al. | 224/153 |
| 4,883,206 A | * | 11/1989 | Miller | 224/153 |
| 5,564,720 A | * | 10/1996 | Stringer | 224/153 X |
| 5,788,400 A | * | 8/1998 | Wey | 403/329 |
| 5,820,141 A | * | 10/1998 | Wilkerson et al. | 280/30 |
| 5,875,946 A | * | 3/1999 | Knudsen | 224/262 |
| 5,946,729 A | * | 9/1999 | Sakurai et al. | 224/153 X |
| 6,202,907 B1 | * | 3/2001 | Higgins | 224/156 |

FOREIGN PATENT DOCUMENTS

| | | | | |
|---|---|---|---|---|
| CH | 626519 A5 | * | 11/1981 | 224/156 |
| GB | 2181640 A | * | 4/1987 | |
| GB | 2228191 A | * | 8/1990 | 224/153 |

* cited by examiner

*Primary Examiner*—Sue A. Weaver
(74) *Attorney, Agent, or Firm*—Renner, Kenner, Greive, Bobak, Taylor & Weber (57) ABSTRACT

A packable cart includes a pair of telescopic side rails with cross members removably positioned therebetween. A pair of wheels are received by the side rails for transportation. A pole handle extends from the ends of the side rails opposite the end near which the wheels are positioned. The packable cart is made of lightweight material and readily assembled and disassembled. A backpack is provided for receiving the cart in its disassembled state. The backpack also serves as a sling between the side rails which, when provided with an inflatable mattress, provides a bed rest. The pole handles are selectively rotatable to serve as support legs when it is desired that the cart be immobile and serve as a bed. The quick assembly of the cart is achieved, in part, by the provision of pin assemblies fixedly received by and operative in association with the cross members. The pin assemblies include a clip movable on a pin which, in the stored position, is received within the tubular cross member and, in an operative position, is movable within a slot in the end of the cross member. A tent canopy is also provided for securement above the cart and across the opposite side rails.

14 Claims, 7 Drawing Sheets

PACKABLE CART

TECHNICAL FIELD

The invention herein resides in the art of transporting devices and, more particularly, to hand carts. Specifically, the invention relates to a hand cart which, when disassembled, may be stored and carried in a backpack and which may later be easily assembled and used either as a transporting cart or a bed with a tent enclosure.

BACKGROUND OF THE INVENTION

Many people engaged in outdoor activities, particularly in wooded or rough terrain, find it desirable to have a wheeled cart available for use. Particularly, hunters of large game such as deer and the like find it desirable to have a cart available to transport their harvest back to a campsite rather than having to drag the carcass alone or carry it with another. Military personnel also find it desirable to have carts available for transporting wounded soldiers, equipment or the like. Moreover, soldiers and hunters find it desirable to have available a sleeping device which maintains them above the ground during sleep, provides a relatively soft support surface, and protects them from the elements.

While it is quite desirable to have a cart and rudimentary bed available in wooded or desolate areas, and while beds and carts are certainly known, the presently available devices are heavy, difficult to transport, cumbersome, and generally unacceptable in that they are difficult to transport to their location of use.

Accordingly, there is a need ill the art for a packable cart which may be easily transported as a backpack into the woods or other location and which may be easily assembled on site for use either as a cart or as a covered bed.

DISCLOSURE OF INVENTION

In light of the foregoing, it a first aspect of the invention to provide a packable cart that fits into a backpack and which is sufficiently light weight to be easily transported as such.

Another aspect of the invention is the provision of a packable cart which is readily convertible into either a cart or a bed.

A further aspect of the invention is the provision of a packable cart in which all the elements of the cart are easily stored in a backpack and, to a large extent, are self contained.

Yet a further aspect of the invention is the provision of a packable cart that is floatable.

Still another aspect of the invention is the provision of a packable cart that is durable, light weight, easy to use, and easy to construct from state of the art materials.

The foregoing and other aspects of the invention which will become apparent as the detailed description proceeds are achieved by a packable cart, comprising: a pair of telescopic side rails; cross members interconnecting said side rails and maintaining them in fixed spaced apart relation; a pair of wheels supporting said side rails; and a pull handle extending from said side rails.

Other aspects of the invention are further attained by a pin and clip assembly received by a tubular member having a slot therein, comprising: a pin fixedly received by an end of the member; and a clip received upon and captured by said pin.

DESCRIPTION OF THE DRAWINGS

For a complete understanding of the objects, techniques and structure of the invention reference should be made to following detailed description and accompanying drawings wherein.

BEST MODE FOR CARRYING OUT THE INVENTION

Figure 1:
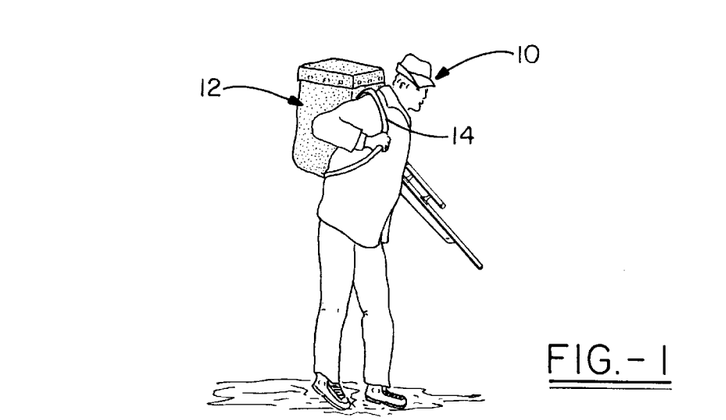
FIG. 1 shows a hunter as he may enter a hunting area carrying a backpack in accordance with the present inventive concept, the hunter being for illustrative purposes only, as other applications exist for the invention.

Referring now to the drawings and more particularly FIG. 1, it can seen that a hunter is designated generally by the numeral 10. It will, of course, be appreciated that the hunter 10 could be a soldier, hiker, or any other individual finding use for the structure and concept of the instant invention. The hunter 10 is shown as carrying a backpack 12, retained in standard fashion by appropriate shoulder straps 14.

Figure 2:
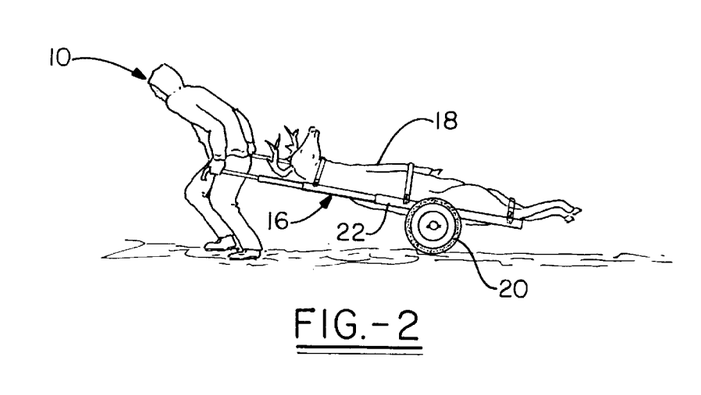
FIG. 2 shows a hunter as he loads out a trophy deer on the cart which comprises the primary object of the present invention.

With reference to FIG. 2, it can be seen that the same individual 10 is shown as employing a cart 16 converted from the backpack 12. The cart 16 is shown as carrying the carcass of a deer 18 or the like. As illustrated, the cart 16 includes a pair of opposed wheels 20 supporting a frame 22. The wheels 20 are preferably of sufficient diameter to accomodate rough terrain and, as will be appreciated hereinafter, the elements of the frame. 22 and the wheels 20 are all preferably of extremely lightweight material to accomodate being carried in the backpack 12. Aluminum, magnesium, and titanium are all appropriate lightweight metals that can be used for the construction of the cart 16, while it is also contemplated that high strength plastics may also be employed.

Figure 3:
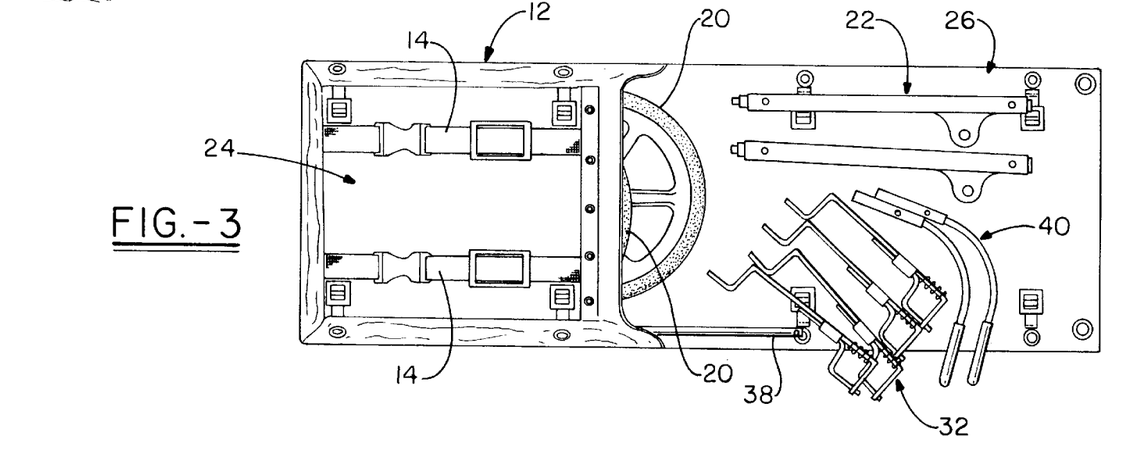
FIG. 3 is a plan view showing the various elements which comprise the total package of the invention concept.

Referring now to FIG. 3, it can be seen that the backpack 12 consists of a sack 24 and an elongated flap 26. The backpack 12 is shown in its opened condition with the various elements of the cart 16 shown in disassembled array, the same being adapted for receipt and maintenance within the pack 12. Indeed, the invention contemplates that each of the components of the cart 16 will be received in appropriate designated sleeves, pockets and holders within the sack 24 or flap 26, isolated from each other to prevent noise in their transport and to assure appropriate weight distribution within the backpack 12.

Figure 4:
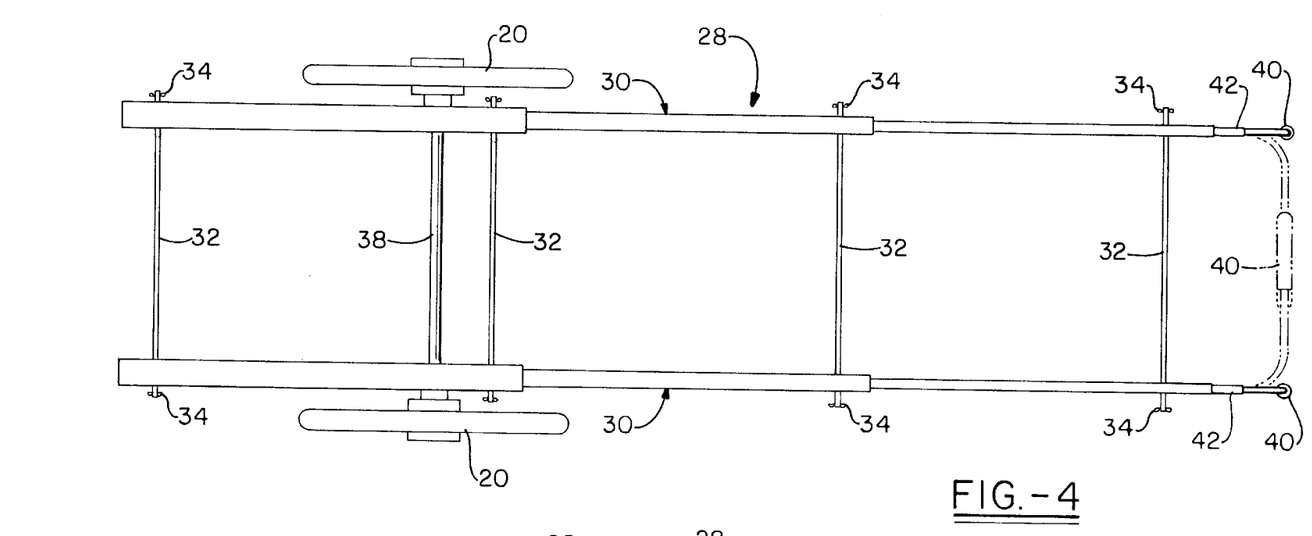
FIG. 4 is a top view of the cart upon assembly of the cart framework which may be accomplished in the field.
Figure 5:
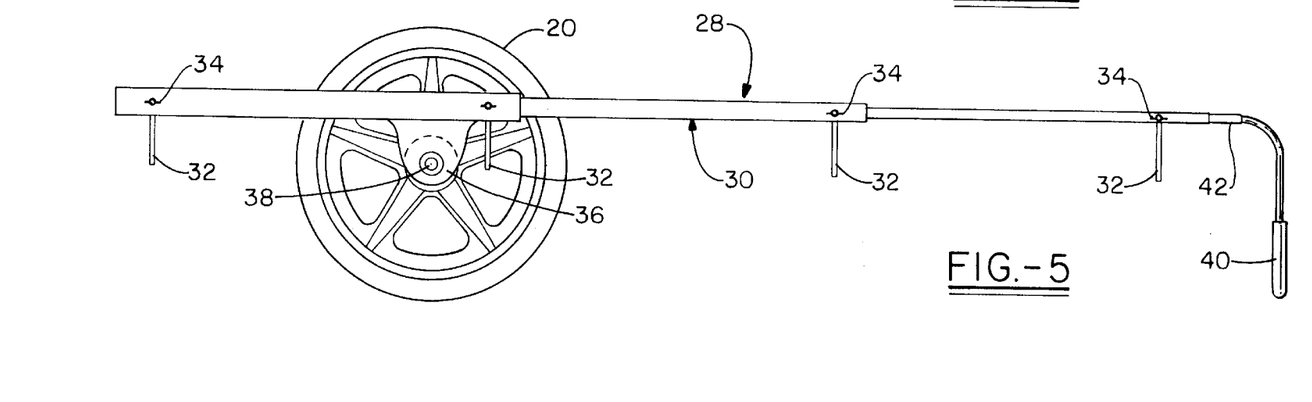
FIG. 5 is a side elevational view of the cart shown in FIG. 4.

With reference now to FIGS. 4 and 5, an appreciation of the structure of the cart frame assembly 28 of the cart 16 may be obtained. The cart frame assembly 28 includes a pair of parallel telescopic side rails 30, preferably comprising three (3) telescopic tubular members. Cross members 32, described in detail later herein, traverse the side rails 30 and retain them in appropriate spaced apart relationship. Pins 34, also described more fully herein, are received in each of the ends of the cross member 32 for purposes of retaining the cross members in place. An axle support flange 36 extends downwardly from each of the side rails 30 and is adapted to receive a transverse a 38 upon which the wheels 20 may be mounted. Of course, the wheels 20 are mounted upon the axle 38 by appropriate pins or the like (not shown).

Extending from an end of the side rails 30, distant from the wheels 20, are a pair of handles or support legs 40, uniquely adapted to serve as both. As shown, the handles and support legs 40 extend from a curved shaft 42 which preferably is of non-circular cross-section. Indeed, a square or rectangular cross-section is preferred. With the telescopic members of the side rails 30 having similar cross-section, it can be appreciated that the handles/support legs with curved shafts 42 are non-rotatable with the receiving telescopic member of the side rails 30 and may be alternately placed as support legs shown in solid lines or as handles as shown in phantom. Of course, appropriate pins (not shown) are used to maintain the handles/support legs 40 within the ends of the associated members of the telescopic rails 30.

Figure 6:
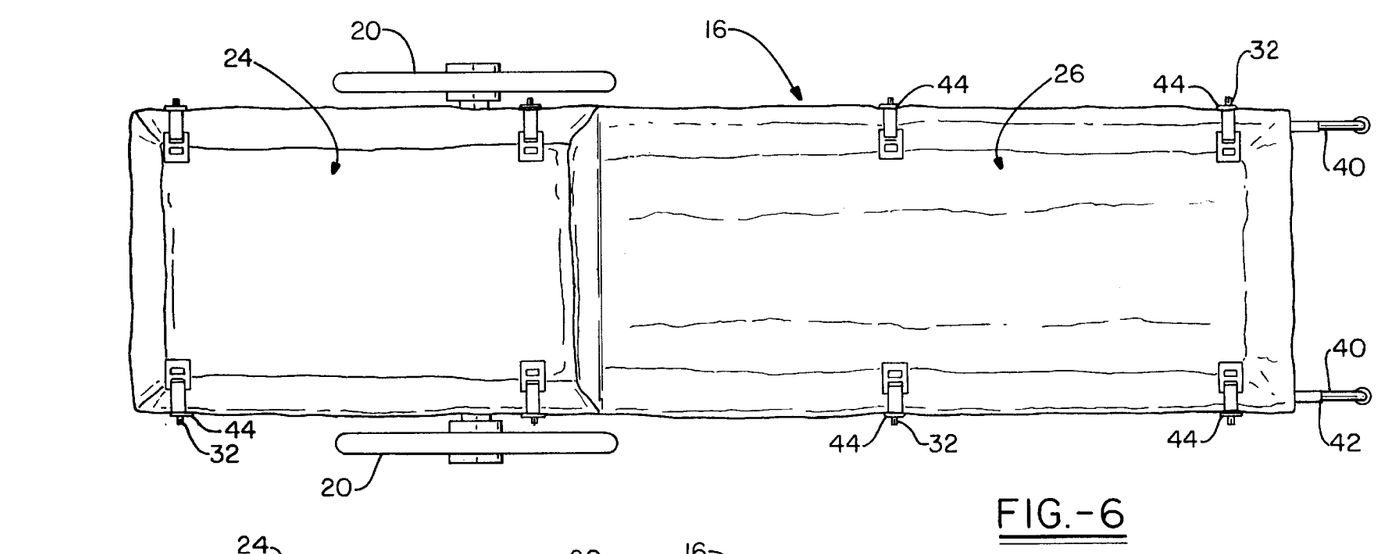
FIG. 6 is a top view similar to FIG. 4, but showing the application of the canvas backpack to the cart framework.
Figure 7:
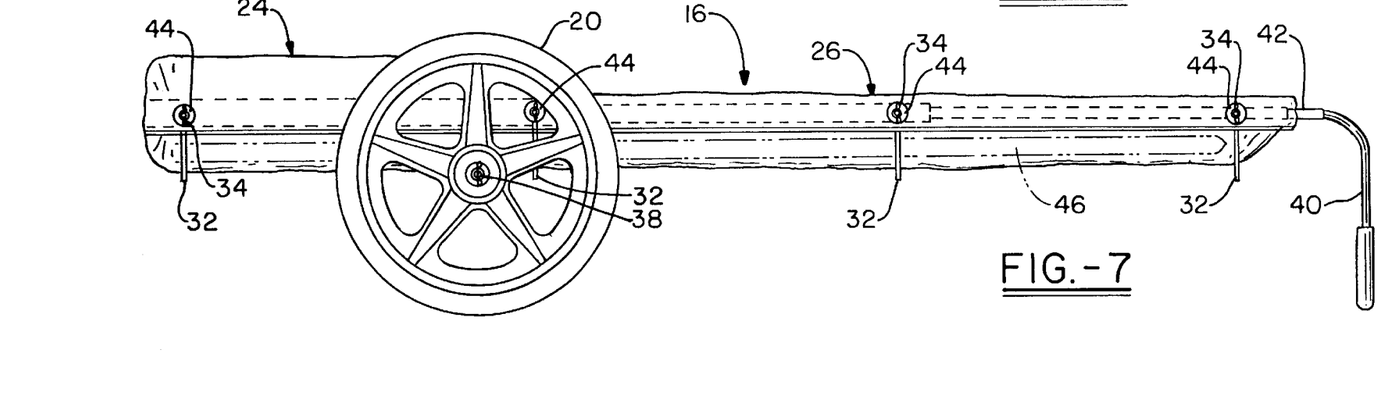
FIG. 7 is a side elevational view similar to FIG. 5, but showing the canvas backpack applied to the cart framework as shown in FIG. 6.

With reference now to FIGS. 6 and 7, it can be seen that the outer structure of the backpack 12 may be placed over the cart frame assembly 28 to further define the cart 16. The sack 24 may serve as a pocket for an individual's feet, for cargo, or for a means for retaining a portion of the carcass of harvested game. The flap 26 extends from the sack 24 towards the support legs 40. Appropriate grommets 44 are employed to secure the flap to the ends of the cross members 32 as shown. Accordingly, the backpack 12, secured by appropriate grommets 44 to the cart frame assembly 28, serves as a sling upon the cart. An air mattress 46 may then be placed upon the sling, with an end thereof received within the sack 24, to thus serve as a sleeping device or the like. It will also be appreciated by those skilled in the art that the utilization of an inflatable air mattress 46 causes the cart 16 to be floatable, if desired.

Figure 8:
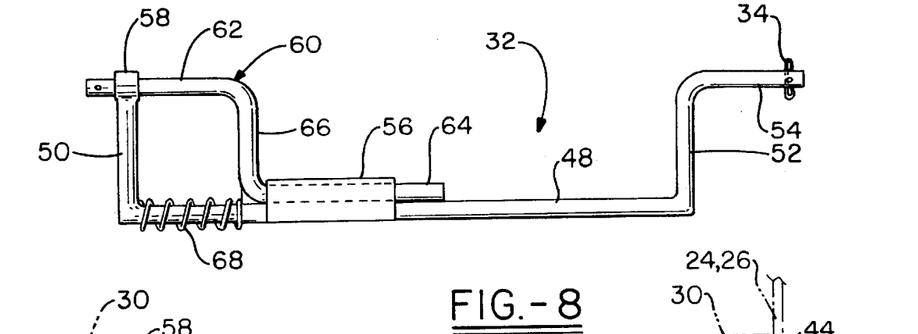
FIG. 8 is an elevational view of a cross member, there being at least four such cross members uses in the assembly of the cart as shown in FIGS. 4 and 5.
Figure 9:
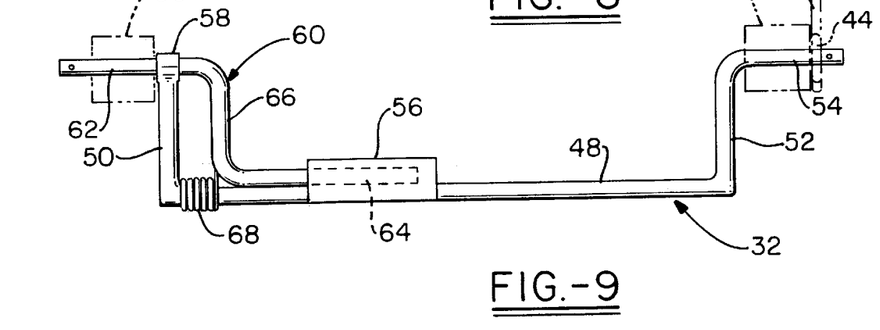
FIG. 9 is an elevational view of the cross member shown in FIG. 8, but illustrated in the operative position within the cart framework.
Figures 10, 17:
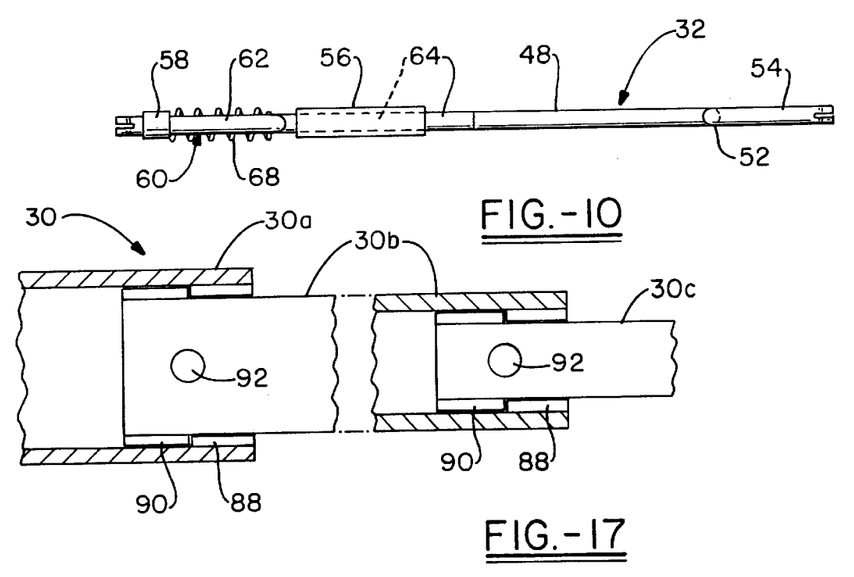
FIG. 10 is a top view of the cross member as shown in FIG. 8.
FIG. 17 is a partial cross-sectional view of the telescopic interconnection of the frame member used in the structure of the cart of the invention.
Figure 11:
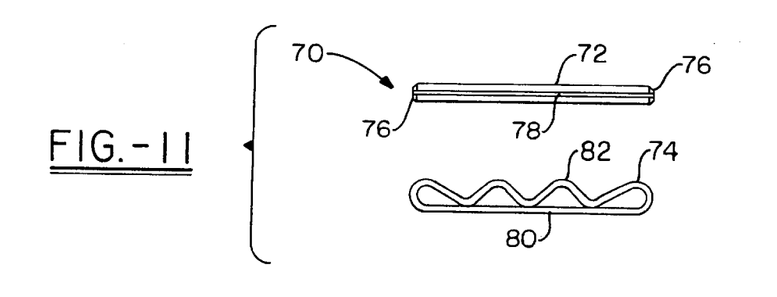
FIG. 11 illustrates pin and key members which together form a fastening system applied to the assembly of the cart.
Figure 12:
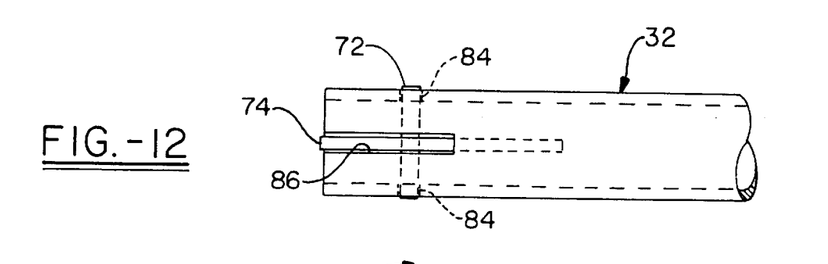
FIG. 12 is a top view showing the pin and key members as applies) to the end of the rod such as, for example, a cross member or an axle for maintaining a wheel on the axle.
Figure 13:
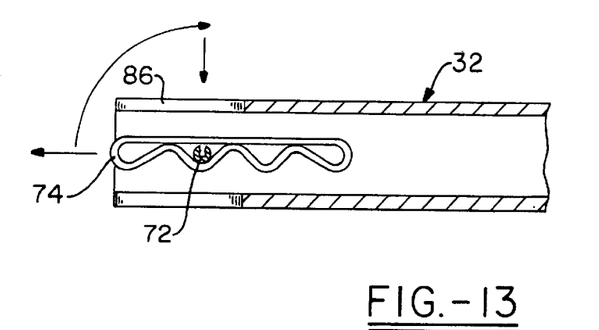
FIG. 13 is a side elevational view, in partial cross-section, of the assembly shown in FIG. 12.
Figure 14:
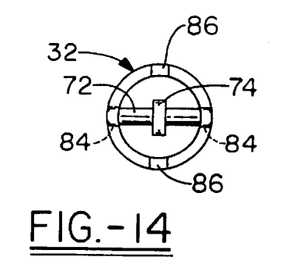
FIG. 14 is an end view of the assembly shown in FIG. 13.
Figure 15:
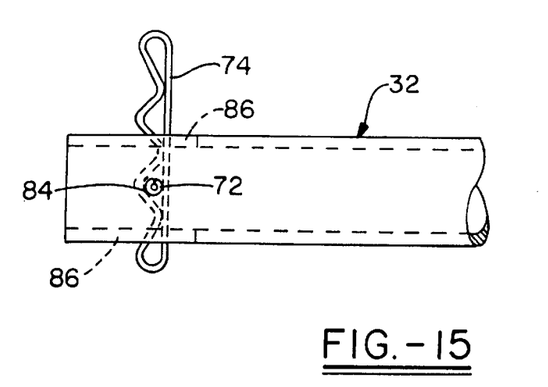
FIG. 15 is a side elevational view similar to FIG. 13, but showing the key member in the operative position.
Figure 16:
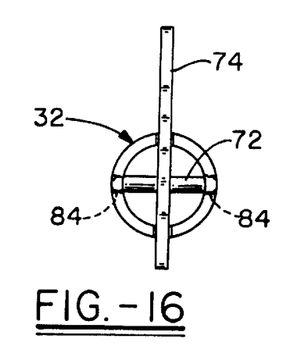
FIG. 16 is an end view of the showing of FIG. 15.

Referring now to FIGS. 8–10, an appreciation and understanding of the structure and operation of cross members 32 may be obtained. As shown, each of the cross members 36 includes a bottom rod 48 with upwardly extending legs 50, 52 at opposite ends thereof. A top rod 54, parallel to the bottom rod 48, extends from the upwardly extending leg 52. A collar 56 is secured to the bottom rod 48 at a point closer to the leg 50 than the leg 52. The leg 50 is provided with a collar 58 at the end thereof. A latch member 60 is slidingly received between the collar 56, 58, as shown. The latch 60 includes a top leg 62 received within the collar 58 and a bottom leg 64 received within the collar 56. A vertically extending leg 66 interconnects the legs 62, 64.

A spring 68 is received upon the bottom rod 48 and is interposed between the legs 50, 66. The spring 68 may be biased to either an open position as shown in FIG. 8 or a closed position as in FIG. 9. If biased to the closed position in FIG. 9, the spring 68 would necessarily be connected to each of the legs 50, 52.

As will be appreciated by those skilled in the art, the rod 54 and top legs 62 are adapted to pass through appropriate bores within the associated side rails 30 to ultimately be retained by means of the pins 34. If the spring 68 biases the, assembly into an open position, the operator must act against the spring to obtain placement of the cross members 32 into engagement with the side rails 30. Conversely, if the spring 68 is such as to bias the cross members into a closed position, the operator must act upon them for release.

Referring now to FIGS. 11–16, an appreciation of the structure of the pins 34 described generally above may be obtained. Here, a pin assembly for use at the ends of the cross members 32 is designated generally by the numeral 70. The pin assembly 70 includes a pin 72 and a clip 74. The pin 72 has tapered ends 76 for ease of insertion, and longitudinal slits 78 to provide a spring loaded or crimped hold when the pin is in place in a bore or receiving aperture 84 in side rails 32. The clip 74 is characterized by a straight leg 80 and a scalloped leg 82.

With continued reference to FIGS. 11–15, it will be seen that the ends of the cross members 32 are not only characterized by bores 84 for receiving the pins 72 in crimped engagement, but they are also provided with axial slots 86 through which the clips 74 may operatively swing. As shown in the drawings, the cross member 32 is a tubular member providing an interior cavity for receiving the clip 74 when not in use. However, when it is desired to use the locking feature of the pin assembly 70, the clip 74 is withdrawn from the tubular cavity of the cross member 32, rotated within the slot 86, and then pushed to a point where the pin 72 engages with an appropriate scallop which retains the clip 74 in a radial orientation with respect to the tubular cross member 32. Accordingly, the cross member 32 would thereby be retained by the side rails 30 and any other elements, such as grommets of the backpack, interposed between the clip 74 and side rail 30 would similarly be retained.

Referring now to FIG. 17, it will be appreciated that each of the side rails 30 comprises telescopic members 30a, 30b, and 30c. Appropriate interior stops 88 and exterior stops 90 are provided to limit the travel of the telescopic movement of the side rail members 30a, 30b and 30c. Pin apertures 92 are provided for receipt of appropriate locking pins once the side rails have been extended to their fully extended position.

Figure 18:
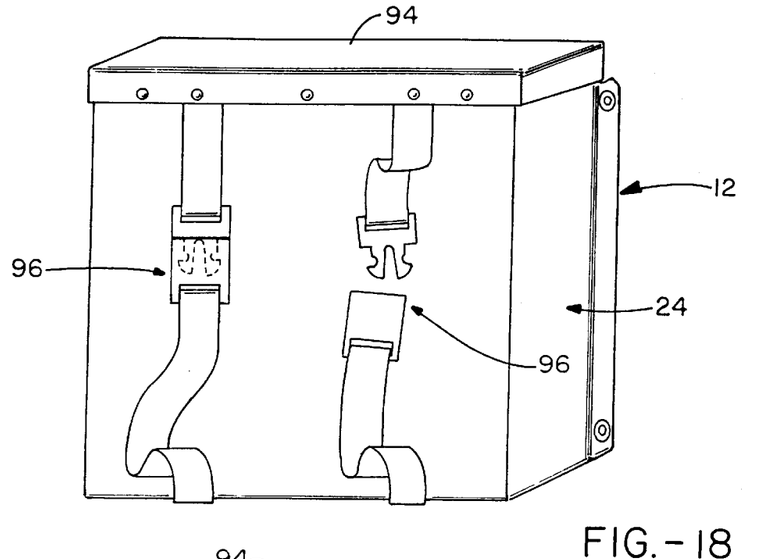
FIG. 18 is a front view of the backpack as it is applied to carrying a disassembled cart as illustrated in FIG. 1.
Figure 19:
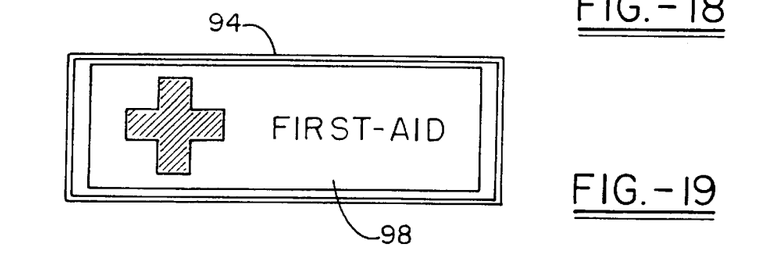
FIG. 19 is a plan view of the inside of the cover member which is used on the backpack and which may be used to house a First-Aid package for use in the field by the person carrying the backpack.

Referring now to FIGS. 18 and 19, it can be seen that the backpack 12 includes a lid 94 secured by straps and buckles 96, in somewhat standard fashion. Unique to the invention, however, is the provision of a First Aid kit 98 integral with the lid 94. Accordingly, the First Aid kit can be quickly accessed for use when the need arises.

Figure 20:
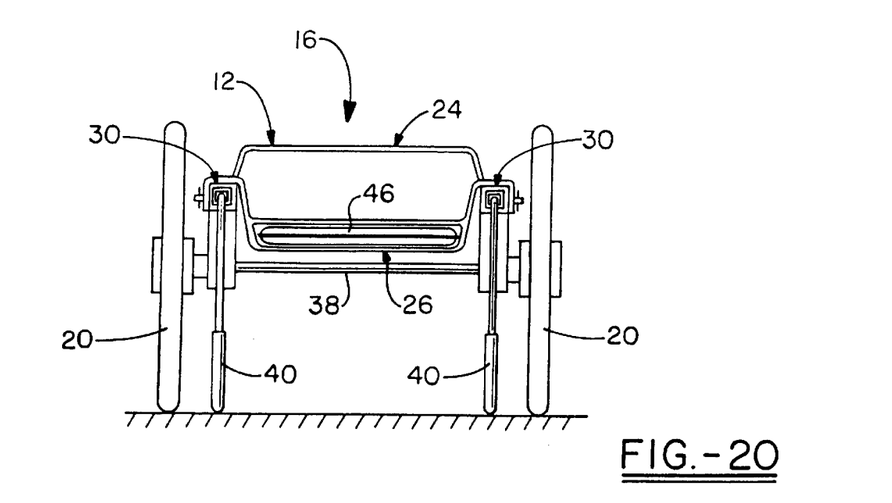
FIG. 20 is a front, elevational view of a cart assembled in accordance with the invention.

As presented above, the cart 16, shown in FIG. 20 in front elevational view in its simple form, fits within the backpack 12 when disassembled. The cart 16 is movable upon wheels 20 of sufficient size to accomodate rough terrain. The combination handle/leg assemblies 40, shown in FIG. 20 in the leg position extend from the side rails 30. An air mattress 46 is supported upon the cross member 32, as is the structure of the backpack itself, the sack 24 thereof being shown in the illustration of FIG. 20. Accordingly, the structure so assembled can serve both as a transport mechanism and, with the members 40 in the leg position, as a resting bed or the like.

Figure 21:
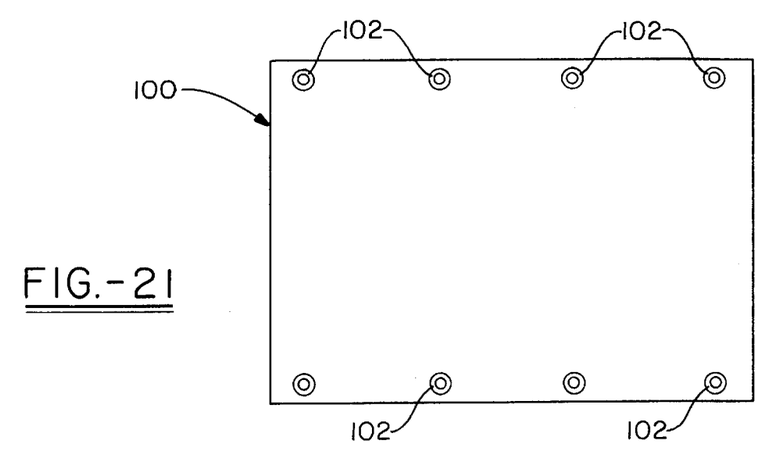
FIG. 21 is a top plan view of a tarpaulin used as a tent cover in accordance with the invention.
Figure 22:
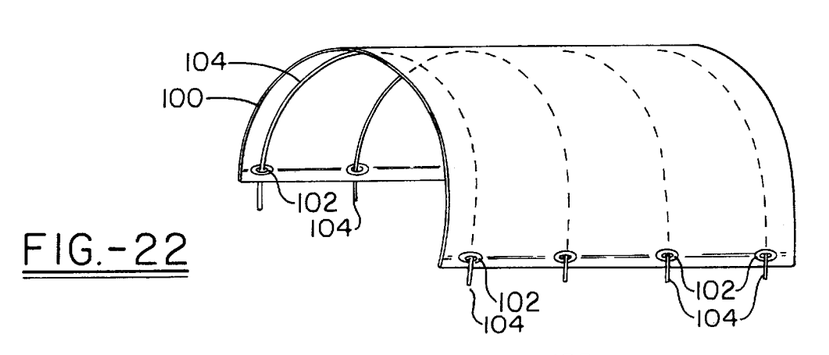
FIG. 22 is an illustration of the tent cover assembly according to the invention.
Figure 23:
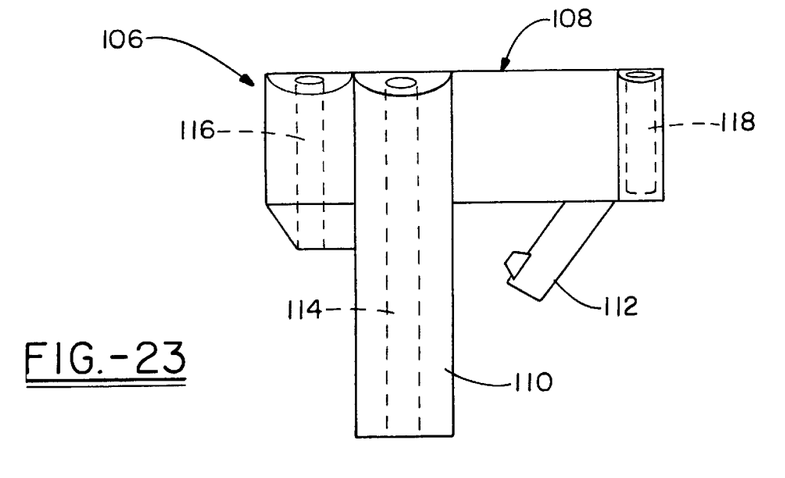
FIG. 23 is a perspective view of a tent pole holder employed in the invention.

With reference now to FIGS. 21–23, an appreciation of the adaptation of the cart 16 for implementation of a tent canopy can be attained. As shown in FIG. 21, a tarpaulin 100 is provided with grommets 102 about the periphery thereof, the grommets 102 being spaced at the general spacing of the cross members 32. A rod 104, preferably of fiberglass or plastic, passes through oppositely disposed grommets and serves as a support member for the tarpaulin 100. The ends of the tent rods 104 are received by tent pole holders 106, shown in FIG. 23. Again, it is preferred that the holders 106 be formed of plastic or other suitable strong and lightweight material. The tent pole holders 106 include a main body portion 108, a tubular portion 110, and a hook portion 112. The tubular portion 110 has a bore 114 therein for receiving one of the upwardly extending legs 50, 52 of the cross members 32. Accordingly, the tent pole holders 106 are positioned at the cross members 32.

As shown in FIG. 23, each of the tent pole holders 105 includes a hook 112 for holding a pull down strap associated with the tarpaulin 100, if desired. Similarly, bores 116 are provided for additional tie downs, if necessary. The bore 118 is provided to receive the ends of the tent rods 104. Accordingly, with the tent rod holders 106 mounted at opposite ends of the cross members 32, the cart 15 can be provided with a protective tent canopy made from a tarpaulin 100 and tent rods 104 in a matter of seconds. The tarpaulin 100 and tent rods 104 are permanently assembled with each other and readily foldable for receipt in the backpack 12.

Thus it can be seen that the objects of the invention have been satisfied by the structure presented above. While in accordance with the patent statutes only the best mode and preferred embodiment of the invention has been presented and described in detail, the invention is not limited thereto or thereby. Accordingly, for an appreciation of the true scope and breadth of the invention reference should be made to the following claims.

What is claimed is:

1. A packable cart, comprising:

a pair of telescopic side rails;

cross members interconnecting said side rails and maintaining them in fixed spaced apart relation;

a pair of wheels supporting said side rails, a pull handle extending from said side rails;

a tent canopy extending above and across said side rails, said tent canopy comprising a tarpaulin supported upon tent poles extending from one of said side rails to another; and tent pole holders received by said side rails and receiving said tent poles, said tent pole holders being mounted on said cross members at said side rails, each said tent pole holder having a bore to receive said cross members and a bore for receiving a tent pole.

2. The packable cart according to claim 1, further comprising a support member extending between said side rails.

3. The packable cart according to claim 2, wherein said support member comprises a backpack having a sack and extending flap.

4. The packable cart according to claim 3, wherein said sack and flap are secured to said cross member.

5. The packable cart according to claim 3, further comprising an inflatable mattress received by said support member.

6. The packable cart according to claim 1, wherein said pull handle is alternatively a support leg, said pull handle and support leg being selectably positionable in said side rails.

7. The packable cart according to claim 1, wherein said cross members comprise a generally U-shaped member operatively receiving a latch member.

8. The packable cart according to claim 7, wherein said latch member is spring biased with respect to said U-shaped member.

9. The packable cart according to claim 1, further comprising a pin and clip assembly retaining said cross members in engagement with said side rails.

10. The packable cart according to claim 9, wherein said pin and clip assemblies are maintained by said cross members at all time.

11. The packable cart according to claim 10, wherein said pin and clip assembly comprises a pin fixedly received by an end of said cross member and a clip movably received and captured upon said pin.

12. The packable cart according to claim 11, wherein said cross member is tubular and has a slot therein, said clip being storable within said tubular cross member and operatively moveable within said slot.

13. The packable cart according to claim 1, wherein said tent pole holders further comprise a hook for receiving a tie-down of said tarp.

14. A pin and clip assembly received by a tubular member having a slot therein, comprising:

a pin fixedly received by an end of the member; and a clip received upon and captured by said pin, said clip being storable within the tubular member and operatively moveable within the slot and further being continuous and scalloped, providing multiple points of securement on said pin.

* * * * *